United States Patent
Eibl et al.

[15] 3,694,474
[45] Sept. 26, 1972

[54] HIGHER ALKANO YL-PROPANEDIOL-(1,3)-PHOSPHORIC ACID-CHOLINE ESTERS

[72] Inventors: Hansjorg Eibl; Otto Westphal, both of Freiburg, Breisgau, Germany

[73] Assignee: Boehringer Ingelheim G.m.b.H., Ingelheim/Rhine, Germany

[22] Filed: July 2, 1971

[21] Appl. No.: 159,552

[30] Foreign Application Priority Data

July 6, 1970 Germany..........P 20 33 361.3

[52] U.S. Cl....................................260/403, 424/199
[51] Int. Cl................................................A23j 7/00

[56] References Cited

UNITED STATES PATENTS 3,542,820  11/1970  Rakhit......................260/403

*Primary Examiner*—Elbert L. Roberts
*Attorney*—Hammond & Littell

[57] ABSTRACT

Compounds of the formula

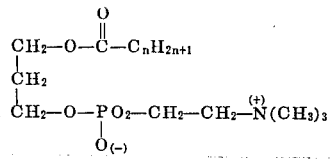

wherein $n$ is an integer from 7 to 14, inclusive; the compounds are useful as immuno-suppressants.

4 Claims, No Drawings

HIGHER ALKANOYL-PROPANEDIOL-(1,3)-PHOSPHORIC ACID-CHOLINE ESTERS

This invention relates to novel higher alkanoyl-propanediol-(1,3)-2'-trimethylammonium-ethyl phosphates, as well as to a method of preparing these compounds.

More particularly, the present invention relates to a novel class of higher alkanoyl-propanediol-(1,3)-2'-trimethylammonium-ethyl phosphates of the formula

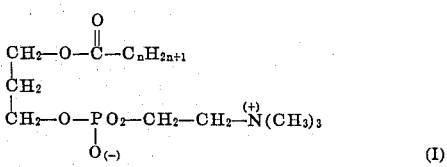

wherein $n$ is an integer from 7 to 14, inclusive.

A compound of the Formula I is prepared by reacting 1,3-propanediol with a higher alkanoyl halide of the formula

wherein $n$ has the same meanings as in Formula I and Hal is halogen, to form a monoester of the formula

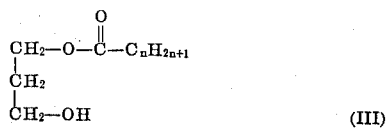

wherein $n$ has the meanings defined above, reacting said monoester with phosphoric acid mono-($\beta$-bromoethyl)-ester dichloride to form a higher alkanoyl-propanediol-(1,3)-phosphoric acid $\beta$-bromoethyl ester of the formula

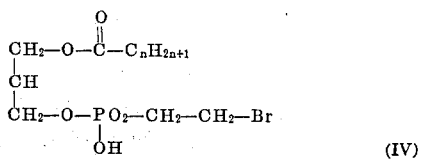

wherein $n$ has the meanings defined above, aminating the ester of the Formula IV with trimethylamine, and removing the bromide ions from the animation product to form the internal salt of the Formula I.

The compounds defined by Formula I above are loose amorphous powders exhibiting no sharply defined, characteristic melting point behavior; therefore, their characterization is established by way of thin-layer chromatography ($R_f$-value) and elemental analysis.

The following examples further illustrate the present invention and will enable others skilled in the art to understand it more completely. It should be understood, however, that the invention is not limited solely to the particular examples given below.

EXAMPLE 1

Capryl-propanediol-(1,3)-2'-trimethylammonium-ethyl phosphate monohydrate a. 1.3-Propanediol monocaprate A solution of 18 millimols of capryl chloride in 20 ml of absolute chloroform was added dropwise to a mixture consisting of 66 millimols of 1,3-propanediol, 5 ml of pyridine and 5 ml of chloroform at 0°C. (ice bath), accompanied by stirring, and the reaction mixture was stirred for 30 minutes more on the ice bath. Thereafter, the ice bath was removed and stirring was continued for 12 hours at room temperature. Subsequently, the reaction solution was concentrated by evaporation in vacuo on a water bath at 40° to 50°C., and the oily residue was poured into 800 ml of 0.2 N sulfuric acid on an ice bath. The white precipitate formed thereby was collected by vacuum filtration, washed thoroughly with water, dried in vacuo over blue silicagel, and recrystallized from petroleum ether (40° to 60°C.). The raw product thus obtained was purified by chromatography on silicagel and recrystallization from petroleum ether, yielding pure 1,3-propanediol monocaprate.

b. Capryl-propanediol-(1,3)-phosphoric acid monocholine ester

Forty-five millimols of anhydrous triethylamine and 18.5 millimols of $\beta$-bromoethyl-phosphoric acid dichloride were added to 15 ml of absolute chloroform at 0°C. (ice bath) and, while stirring the mixture on the ice bath, a solution of 6.5 millimols of 1,3-propanediol monocaprate in 15 ml of absolute chloroform was added dropwise thereto. The resulting reaction mixture was then allowed to stand at room temperature for 6 hours and at 40°C. for 12 hours. Subsequently, the dark-colored solution was cooled to 0°C., and then 15 ml of 0.1 N potassium chloride were added to hydrolyze the phosphoric acid chlorides. Thereafter, the reaction mixture was stirred for 1 hour, 25 ml of methanol were added, the pH was adjusted to about 3 with concentrated hydrochloric acid, and the acidic mixture was thoroughly shaken. The organic phase was evaporated, and the residue was dried over phosphorus pentoxide in a high vacuum.

A mixture consisting of the phosphorylation product thus obtained, 50 ml of butanol and 10 ml of trimethylamine was heated for 12 hours at 55°C., the mixture was then cooled to 0°C., and the crystalline precipitate formed thereby was collected by vacuum filtration and washed with acetone, with water and again with acetone. For further purification, the product was stirred for 30 minutes with a solution of 1 gm of silver acetate in aqueous 90 percent methanol, then chromatographed on silicagel and finally recrystallized from butanone, yielding 50 percent of theory (based on 1,3-propanediol monocaproate) of the internal salt of the formula

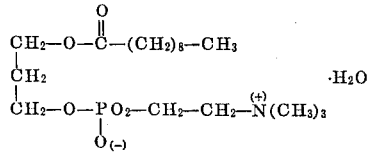

having an $R_f$-value of 0.10 in chloroform/methanol/water (65:30:4).

Analysis: (Monohydrate) $C_{18}H_{40}NO_7P$; mol. wt. 413.6
Calculated: C — 52.2%; H — 9.74%; N — 3.38%; P — 7.48%
Found: C — 51.1%; H — 9.85%; N — 3.35%; P — 7.40%

EXAMPLE 2

Using a procedure analogous to that described in Example 1, lauroyl-propanediol-(1,3)-2'-trimethylammonium -ethyl phosphate of the formula

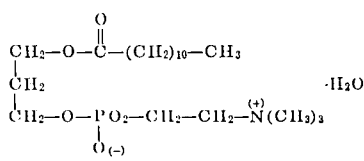

was prepared from 1,3-propanediol monolaurate, β-bromoethyl-phosphoric acid dichloride and trimethylamine. The product has an $R_f$-value of 0.10.
Analysis: $C_{20}H_{44}NO_7P$; mol. wt. 441.6
Calculated: C—54.4%; H—10.03%; N—3.19%; P—7.02%
Found: C—52.9%; H—10.44%; N—3.12%; P—6.95%

EXAMPLE 3

Using a procedure analogous to that described in Example 1, myristoyl-propanediol-(1,3)-2'-trimethylammonium-ethyl phosphate of the formula

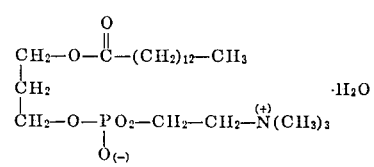

was prepared from 1,3-propanediol monomyristate, β-bromoethyl-phosphoric acid dichloride and trimethylamine. The product had an $R_f$-value of 0.10.
Analysis: $C_{22}H_{28}NO_7P$; mol. wt. 469.6
Calculated: C—56.3%; H—10.33%; N—2.98%; P—6.60%
Found: C—54.5%; H—10.53%; N—2.93%; P—6.51%

The compounds according to the present invention, that is, the internal salts embraced by Formula I above, have useful pharmacodynamic properties. More particularly, the compounds of the instant invention exhibit interfacial surfactive properties and, when perorally or parenterally administered to a warm-blooded animal, such as mice, produce a change of the interfacial surface activity of the cell membranes. Higher concentrations produce cytolytic phenomena, such as hemolysis, but at sublytic dosage levels a dosage-dependent alteration of the membrane interfacial activity is observed. Thus, the compounds of the instant invention are useful as immuno-suppressants in warm-blooded animals; the dosage range which produces immuno-suppression widens as the carbon chain length of the fatty acid moiety decreases.

For pharmaceutical purposes the compounds of the Formula I are administered to warm-blooded animals perorally or parenterally, but preferably by intraperitoneal injection, as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective immuno-suppressant dosage unit of the compounds of the instant invention is from 0.01 to 5 mgm/kg body weight, depending upon the degree of suppression of immune response desired.

The following examples illustrate a few dosage unit compositions comprising the compound of the Formula I as an active ingredient and represent the best modes contemplated of putting the invention to practical use. The parts are parts by weight unless otherwise specified.

EXAMPLE 4

Coated Pills

The pill core composition is compounded from the following ingredients:

| | |
|---|---:|
| Lauroyl-propanediol-(1,3)-phosphoric acid monocholine ester (Example 2) | 100.0 parts |
| Secondary calcium phosphate, anhydrous | 73.0 parts |
| Corn starch | 55.0 parts |
| Polyvinylpyrrolidone | 5.0 parts |
| Carboxymethyl cellulose | 5.0 parts |
| Magnesium stearate | 2.0 parts |
| Total | 240.0 parts |

Preparation

The monocholine phosphate is intimately admixed with the calcium phosphate and the corn starch, the resulting mixture is moistened with an ethanolic 10 percent solution of the polyvinylpyrrolidone, the moist mass is forced through a 1.5 mm-mesh screen, the resulting granulate is dried at 45°C. and again passed through the screen, the dry granulate is uniformly admixed with the carboxymethyl cellulose and the magnesium stearate, and the finished composition is compressed into 240 mgm-pill cores which are subsequently coated with a thin shell consisting essentially of a mixture of talcum and sugar and polished with beeswax. Each coated pill contains 100 mgm of the monocholine phosphate and is an oral dosage unit composition with effective immuno-suppressant action.

EXAMPLE 5

Tablets

The tablet composition is compounded from the following ingredients:

| | |
|---|---:|
| Capryl-propanediol-(1,3)-phosphoric acid monocholine ester monohydrate (Example 1) | 200.0 parts |
| Lactose | 100.0 parts |
| Corn starch | 80.0 parts |
| Polyvinylpyrrolidone | 12.0 parts |
| Cellulose, microcrystalline | 54.0 parts |
| Magnesium stearate | 4.0 parts |
| Total | 450.0 parts |

Preparation

The monocholine phosphate is intimately admixed with the lactose, the corn starch and the polyvinylpyrrolidone, the mixture is moistened with water; the moist mass is forced through a 1.5 mm-mesh screen, dried at 45°C. and again passed through the screen; the resulting dry granulate is uniformly admixed with the cellulose and the magnesium stearate, and the finished composition is compressed into 450 mgm-tablets. Each tablet contains 200 mgm of the monocholine phosphate and is an oral dosage unit composition with effective immuno-suppressant action.

EXAMPLE 6

Drop Solution

The solution is compounded from the following ingredients:

| | | |
|---|---|---|
| Myristoyl-propanediol-(1,3)-phosphoric acid monocholine ester (Example 3) | | 1.0 parts |
| Methyl p-hydroxybenzoate | | 0.035 parts |
| Propyl p-hydroxybenzoate | | 0.015 parts |
| Propyleneglycol | | 45.0 parts |
| Oil of anise | | 0.05 parts |
| Menthol | | 0.05 parts |
| Saccharin sodium | | 1.0 parts |
| Ethanol | | 1.0 parts |
| Distilled water | q.s.ad | 100.0 parts by vol. |

Preparation

The propyleneglycol is admixed with 45 parts of distilled water, and the monocholine phosphate is dissolved in the mixture (solution A). The p-hydroxybenzoates, the menthol and the oil of anise are dissolved in the ethanol (solution B). Solutions A and B are admixed, the saccharin sodium is added, and the resulting solution is diluted with distilled water to the indicated volume and filtered. One ml of the filtrate (about 20 drops) contains 10 mgm of the monocholine phosphate and is an oral dosage unit composition with effective immuno-suppressant action.

EXAMPLE 7

Hypodermic Solution

The solution is compounded from the following ingredients:

| | | |
|---|---|---|
| Lauroyl-propanediol-(1,3)-phosphoric acid-monocholine ester monohydrate | | 50.0 parts |
| Polypropyleneglycol | | 2500.0 parts |
| Tartaric acid | | 15.0 parts |
| Distilled water | q.s. ad | 5000.0 parts by vol. |

Preparation

Two thousand parts of distilled water are heated to about 50°C., and then the indicated amount of polypropyleneglycol is added thereto; thereafter, the monocholine phosphate and the tartaric acid are dissolved therein, and the resulting solution is diluted with additional distilled water to the indicated volume. The finished solution is filtered until free from suspended particles, and the filtrate is filled into 5 ml-ampules which are then sealed and sterilized. Each ampule contains 50 mgm of the monocholine phosphate, and the contents thereof are an intraperitoneally injectable dosage unit composition with effective immuno-suppressant action.

Analogous results were obtained when any one of the other compounds embraced by Formula I was substituted for the particular monocholine ester in Examples 4 through 7. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

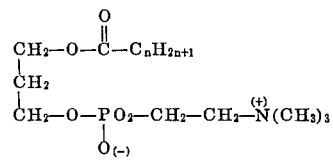

wherein $n$ is an integer from 7 to 14, inclusive.

2. A compound according to claim 1, which is capryl-propanediol-(1,3)-2'-trimethylammonium-ethyl phosphate.

3. A compound according to claim 1, which is lauroyl-propanediol-(1,3)-2'-trimethylammonium-ethyl phosphate.

4. A compound according to claim 1, which is myristoyl-propanediol-(1,3)-2'-trimethylammonium-ethyl phosphate.

* * * * *